April 1, 1941.  J. F. COOK  2,236,868
VEHICLE SUSPENSION
Filed March 2, 1939  2 Sheets-Sheet 1
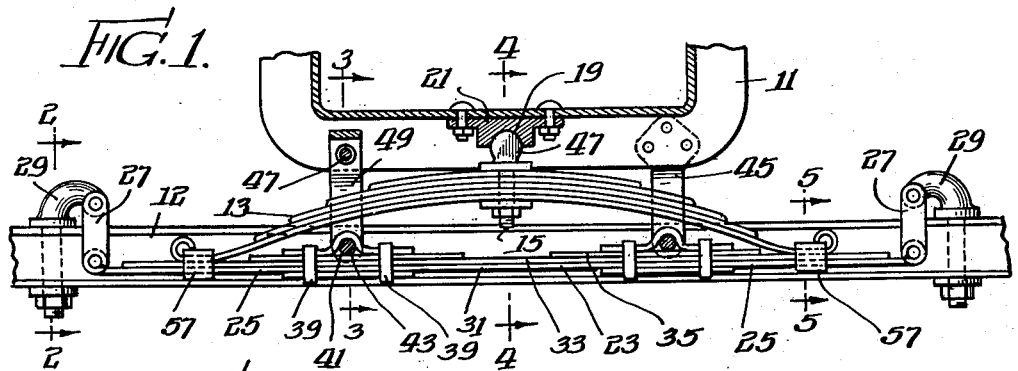
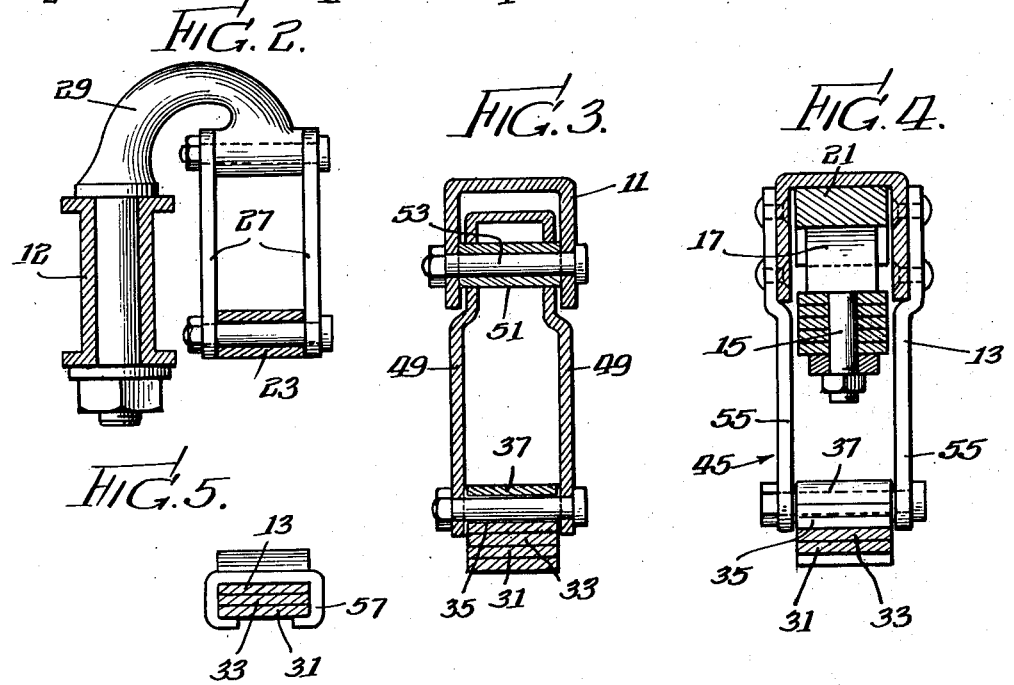
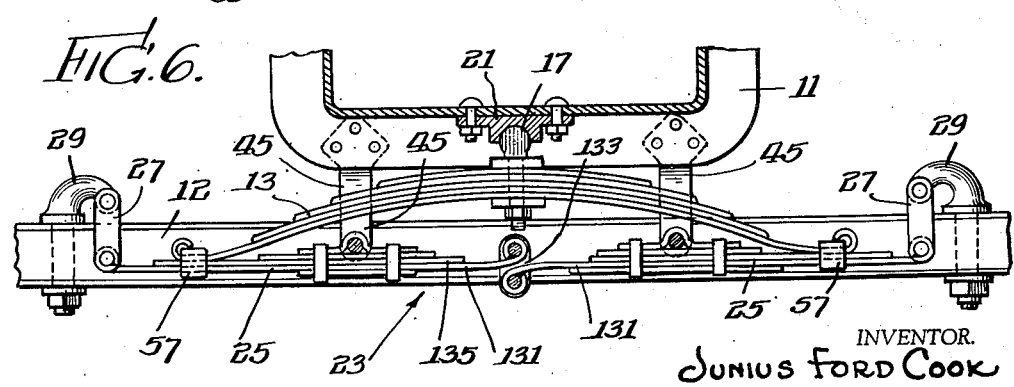
INVENTOR.
JUNIUS FORD COOK
BY:— Cox + Moore.
ATTORNEYS April 1, 1941.   J. F. COOK   2,236,868
VEHICLE SUSPENSION
Filed March 2, 1939   2 Sheets-Sheet 2
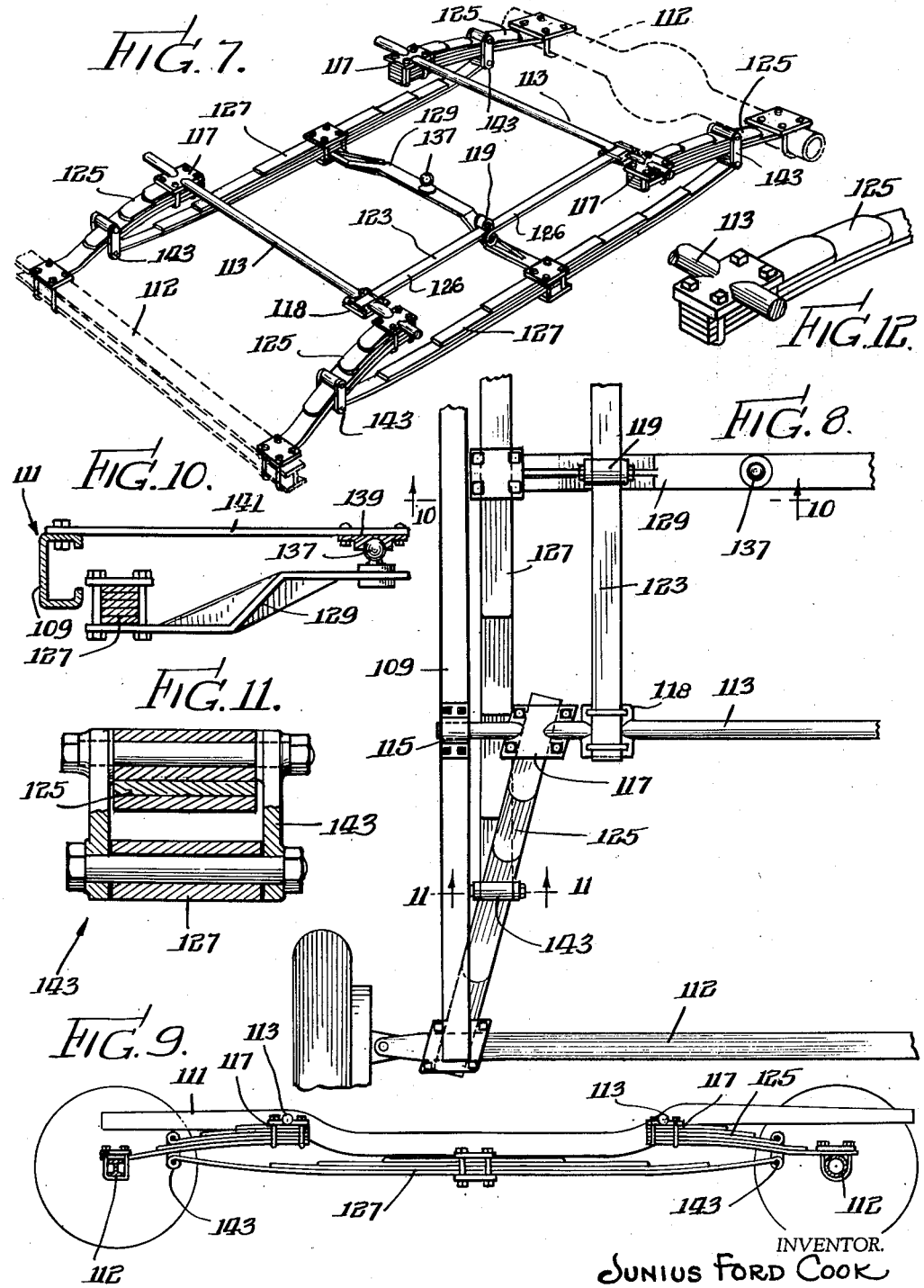
INVENTOR.
JUNIUS FORD COOK
BY:— Cox + Moore
ATTORNEYS Patented Apr. 1, 1941

2,236,868

UNITED STATES PATENT OFFICE 2,236,868

VEHICLE SUSPENSION

Junius Ford Cook, Johannesburg, Transvaal, Union of South Africa

Application March 2, 1939, Serial No. 259,342

8 Claims. (Cl. 280—124)

My present invention relates in general to vehicle suspension and has more particular reference to means for stabilizing and resiliently suspending the chassis of a vehicle, more especially an automotive vehicle, wherein the chassis of the vehicle is resiliently supported or suspended upon wheel-carrying axle means in a manner permitting relative movement of the chassis with respect to the wheels.

An important object of the invention is to provide a vehicle suspension having relatively soft and resilient spring means arranged to resist the vertical component of relative movement between the chassis and the wheels and including resilient stabilizing means to resist the tilting or relative angular component of movement of the chassis with respect to the vehicle wheels; a further object being to provide a suspension system having separate, inter-connected spring means, the one active substantially to suspend the weight of the chassis on the wheel-carrying axle means of the vehicle, and the other to resist relative turning movement between chassis and axle means, of the character known commonly as rolling and/or pitching.

Another important object is to utilize, in stabilizing a vehicle, spring means, in addition to the load or weight-carrying spring means, the stabilizing means being connected with the vehicle and with the wheel-carrying axle means on opposite sides of an axis about which the chassis may tilt with respect to the axle means, the stabilizing spring means being operable, upon tilting of the chassis with respect to the axle means, to apply forces between the chassis and the axle means simultaneously, and on opposite sides of the tilting axis in a direction tending to return the chassis to normal position with respect to the axle means; a further object being to utilize the stabilizing means under normal conditions only for stabilizing the vehicle, and to provide separate load-carrying means for supporting the chassis from the axle means and for counterbalancing only the vertical component of relative movement between the chassis and the axle means.

Another important object is to provide, in a vehicle suspension system, stabilizing means for suppressing a tilting movement of the chassis with respect to the axle means of the vehicle, and comprising a parallel motion linkage embodying non-rigid frame means preferably formed of leaf springs whereby substantially to prevent the transmission of shocks between the axle means and the chassis through the frame means; a further object being to constitute the frame means as a parallel motion linkage interconnecting the chassis with the axle means.

A further object is to form the stabilizing linkage as a pair of horizontally disposed and symmetrically arranged leaf spring frames, one end of each of which is connected to the axle means, the spring frames being interconnected at a point between the axle connected ends thereof, and each frame being pivotally connected with the chassis on opposite sides of the tilting axis thereof.

A further object of the invention is to employ the chassis supporting or weight carrying springs only for resisting the vertical component of relative movement of the chassis with respect to the axle means, and in order to deprive the weight carrying spring of any tilt resisting function, it is preferably arranged as a transverse element having pivotal connection with the chassis.

These and numerous other important objects, advantages and inherent functions of the invention will become apparent as the same is more fully understood from the following description, which, taken in connection with the accompanying drawings, discloses preferred embodiments of the invention.

Referring to the drawings,

Figure 1 is an elevational view of a vehicle suspension embodying my present invention;

Figures 2, 3, 4 and 5 are sectional views, respectively, taken substantially along the lines 2—2, 3—3, 4—4 and 5—5 in Figure 1;

Figure 6 is an elevational view illustrating a modified arrangement of parts forming a vehicle suspension embodying my present invention;

Figure 7 is a perspective view of a vehicle suspension embodying my present invention;

Figure 8 is a partial plan view of the suspension illustrated in Figure 7, as applied in a vehicle;

Figure 9 is an elevational view of the suspension shown in Figure 7;

Figure 10 is a sectional view taken substantially along the line 10—10 in Figure 8;

Figure 11 is a sectional view taken substantially along the line 11—11 in Figure 8; and Figure 12 is an enlarged fragmentary perspective view of a part of the mechanism shown in Figures 7, 8 and 9.

To illustrate my invention, I have shown on the drawings, in Figures 1–6, preferred forms of a vehicle suspension system for supporting the chassis 11 of the vehicle from the wheel carrying axle means 12 and, while I have illustrated the axle in the form of a solid, continuous beam extending between spaced wheels carried at the opposed ends of the axle, the invention, of course, is not necessarily restricted to the particular form of axle illustrated but may be applied in conjunction with any preferred form of wheel mounting, including separate wheel carrying frames pivoted on the chassis, as in the so-called "knee action" suspensions.

The suspension of my present invention, as shown in Figures 1–6, contemplates the provision of yielding suspension means of any suitable character, preferably a transverse leaf spring 13, the opposite ends of which are suspended upon the axle means 12 adjacent the spaced wheel carrying portions thereof, the spring being connected at its medial portions with the chassis 11 whereby to support the same upon the axle means, and to resist downward movement of the chassis vertically toward the axle means.

While the transverse spring may be rigidly clamped to the chassis in any suitable or usual fashion, I prefer to attach the spring so that it may have relatively pivotal movement with respect to the chassis so that the spring 13 is substantially free of any loading due to relative angular movement of the chassis with respect to the axle means. To this end the spring clamping bolt 15 may be formed with a head 17 of cylindrical configuration adapted to seat in a suitable recess 19 formed in the frame of the chassis, as by securing a seat or saddle 21 thereon.

The head 17 and recess may be maintained in engagement in any suitable fashion or the weight of the chassis alone may be relied on to hold the parts in operative engagement. Alternately, the head 17 may be imbedded in a rubber or resilient mounting. I do not, however, necessarily restrict my invention to the combination including a transverse weight carrying spring, as other forms of spring suspension may be applied to resiliently support the weight of the chassis on the axle means, without necessarily affecting the operation of the stabilizing system in the combination.

In order to counteract tilting movement of the chassis with respect to the axle means, such as is commonly designated "rolling" or "swaying," caused by the passage of the vehicle over an irregular road bed or when turning, I provide a parallel motion linkage preferably comprising frame means 23. The frame means 23 embodies two parts 25 which, as shown in Figure 6 of the drawings, may comprise separate elements or, as shown in Figure 1, comprises a single element having two active portions. While these portions may be of rigid construction, I prefer to arrange them so as to provide a yielding connection between the chassis and axle means, and to this end find it convenient and advantageous to form the portions 25 as leaf springs.

The stabilizing means 23, as shown in Figure 1, is formed for connection at its opposite ends to the spaced axle carrying portions of the axle means 12 in any suitable fashion permitting pivotal and relatively horizontal movement, to enable the portions 25 to flatten or increase curvature when acting as springs. To this end, the opposed outwardly-extending ends of the portions 25 may be connected by means of shackles 27 carried on a suitable perch or mounting 29 on the axle means 12.

As shown in Figure 1 of the drawings, the element 23 comprises a main leaf 31, the opposed ends of which are connected, respectively, on the shackles 27, and a relatively shorter overlying leaf 33, these elements 31 and 33 extending in both portions 25.

As shown in Figure 6, the portions 25 are constructed as separate elements, each comprising a leaf 131 formed at one end for suspension on the shackle 27, the remote ends of the leaves 131 being connected together by means of the shackle 133. The elements also comprise additional leaves.

Each of the portions 25, in both embodiments, is provided with means for connecting the same with the chassis frame 11 at points therein on opposite sides of the tilting axis of the chassis defined by the weight carrying spring mount 21. This means preferably comprises a strap 37 secured on the portion 35 by clamping means 39 which serves also to hold the several leaves comprising the portion 25 together. The member 37 is formed to receive a bushing 41 containing a pin 43, the opposite ends of which carry links 45 which extend upwardly of the portions 25 and are connected on the frame 11.

As shown in Figure 1 of the drawings, wherein the stabilizing frame 23 is continuous between the spaced suspension links 27, one of the links 45 is pivoted upon the frame as at 47, the other link being secured rigidly on the frame. In the form shown in Figure 6, both of the links 45 are rigidly fastened on the frame 11.

The construction of the link which is pivoted on the frame as at 47, in Figure 1, is illustrated clearly in Figure 3, and comprises a bent member 49 forming a pair of spaced arms, between the ends of which the pin 43 extends and is secured. The upper end of the member 49 carries a bushing 51 therein in position to receive a pin 53 which is secured in and between spaced-apart flanges forming a portion of the frame 11.

The links 45 that are rigidly secured on the frame 11 may be of any suitable or preferred form and may be integral portions of the frame 11 or, as shown in the drawings, more particularly in Figure 4, may comprise separate pieces 55 riveted, bolted, or otherwise secured upon the spaced flanged portions of the frame 11.

The weight carrying spring 13 may, of course, be secured on the axle means 12 in any suitable or preferred fashion, as, for example, by linking the opposed ends of the spring 13 in shackles similar to the shackles 27. I prefer, however, to arrange the spring 13 so that its opposed ends simply rest upon the stabilizing means 23 near the ends thereof that are connected in the shackles 27, and I may provide any suitable bearing or suspension means, as, for example, shackles, on the stabilizing means for the reception of the ends of the spring 13. I prefer, however, to permit the ends of the spring 13 simply to rest and ride directly upon the leaves forming said stabilizing means adjacent the shackles 27, and I may provide a retaining band 57 encircling each end of the spring 13 and the portions of the stabilizing means 23 on which said ends rest, this retaining band and its relationship in the assembly being illustrated most clearly in Figure 5 of the drawings.

When the vehicle is at rest, its weight acts vertically downwardly through the weight carrying spring 13, and this weight is balanced by the upward reaction of the road upon the wheels of the vehicle. This upward reaction is communicated directly to the ends of the stabilizing means and produces turning moments on the end sections thereof about the points of connection of this spring with the weight carrying spring. These turning moments are counterbalanced by the tension in the brackets 45, and the interconnected ends of the portions 25 are substantially unstressed when the vehicle is normally loaded, this being insured by suitably relating the stiffness of the weight carrying spring, the position of its connection with the stabilizing means, and the position of the brackets 45 with respect to the weight of the vehicle.

When the vehicle is moving in a curved path, thereby causing the chassis to roll toward one side, the rolling tendency, since the chassis is freely pivoted on the weight carrying spring, will not be resisted or directly controlled by the weight carrying spring. Rolling, however, will reduce the tension upon the link or bracket 45 toward which the roll occurs, so that the portion of the stabilizing means connected with said bracket will tend to drop under the pressure exerted at the end of the weight carrying spring. The dropping of said portion of the stabilizing means will tend to force down the other portion of the stabilizing means, thereby increasing the tension on the link 45 connected therewith, thereby resisting the tendency of the chassis to roll.

When the vehicle, in proceeding along a straight path, strikes a bump on one side of the vehicle, the bumping will result in an increased upward force upon the end of the stabilizing means at the bumped side. This force will be transmitted to the chassis through the weight carrying spring and the head 17, without, however, tending to rotate the chassis about its axis. At the same time, the end portion of the stabilizing means on the bumped side of the vehicle tends to turn in the manner of a lever about its point of connection with the weight carrying spring, thus applying an increased downward tension upon the link or bracket 45 connecting said turned portion of the stabilizing means with the chassis, thereby tending to pull the chassis downwardly on the bumped side of the vehicle. The lever actions of the weight carrying and stabilizing springs also increase the tension in the link or bracket on the opposite side of the vehicle, serving to stabilize the chassis against excessive outward tilting or swaying. Should both wheels strike a bump simultaneously, both ends of the stabilizing means 23 will rise, lifting the ends of the weight carrying spring. Each side of the stabilizing means will tend to pivot about its point of connection with the link or bracket 45, thus flexing the entire central portions of the weight carrying means downwardly, and it will be seen that the resiliency of the stabilizing spring may thus be used to supplement the action of the weight carrying spring in absorbing the shock of the bump.

In Figures 7–12, inclusive, I have shown a preferred mode of applying the suspension of my present invention longitudinally, the arrangement illustrated in Figures 1–6 illustrating lateral application of the suspension.

As shown in Figures 7–12, the side members 109 of the vehicle frame 111 carry transversely extending shafts 113 journalled in suitable bearings 115 on said side members 109. These shafts 113 are formed with preferably flattened portions 117 forming plates on which spring-like portions 125 are secured. These portions 125 correspond with the portions 25 of the stabilizing means shown in Figures 1–6, and extend from the shafts 113 outwardly to the axle means 112, there being a pair of portions 125 extending forwardly and secured on the front axle of the vehicle, while a like pair of members 125 extend rearwardly of the chassis for connection with the rear axle of the vehicle.

The spaced shafts 113 also are interconnected by resilient, preferably leaf spring members 123 which may be secured on plate-like portions 118 on the shafts 113, which plate-like portions are preferably similar to the portions 117.

If desired, the connecting means 123 may comprise a continuous spring or it may comprise a pair of spring portions 126 connected, one on each of the shafts 113, to form, in effect, continuations of said springs 125 with the free ends of the springs shackled, as at 119.

In conjunction with the stabilizing springs 125 I provide weight carrying spring means comprising, in the illustrated embodiment, a pair of longitudinally extending spring members 127, the medial portions of which are mounted and clampingly received in the opposed ends of a frame or yoke 129 which extends transversely of the vehicle frame. The yoke 129 at its mid point, between the members 127, is provided with a preferably spherical bearing member 137 in position to engage in a corresponding seat 139 formed in a suitable saddle mounted on the frame of the vehicle as by means of a mounting bar 141 which may be in the form of a spring or a rigid bar, if desired, the member 141 being secured on the side members 109 of the vehicle frame. The opposite ends of each of the spring portions 127 are shackled, as at 143, or otherwise suspended or connected with the forwardly and rearwardly extending portions 125 of the stabilizing system on one side of the vehicle, the specific details of the shackling arrangement at 143 being illustrated clearly in Figure 11 of the drawings, wherein the end of the weight carrying spring 127 is curled to receive a shackle pin. One of the leaves of the spring portion 125 is also curled to receive another shackle pin, both pins being interconnected by shackle links extending on opposite sides of the shackled spring portions.

When the vehicle is turned in one direction, to travel a curved path any tendency to roll away from the direction of turn is resisted by the action of the spring portions 125. These spring portions are compressed on the side toward which the vehicle tends to roll, thus rotating the shafts 113 in a direction to release tension in the spring portions 125 on the opposite side of the vehicle, and thus to diminish or remove the upward thrust of said portions on the vehicle whereby the spring portions are prevented from aiding in the rolling tendency.

The arrangement also minimizes pitching of the vehicle. When both front wheels go over a bump simultaneously and bump up the front end of the chassis, the connection 123 moves the rear spring portions 125 in a direction to increase the stress therein, thus tending to lift the back end of the vehicle. Thus, when either front or back wheels go over a bump, the entire chassis tends to move bodily upwardly rather than to be rotated in a pitching fashion.

It is thought that the invention and numerous of its attendant advantages will be understood from the foregoing description, and it is obvious that numerous changes may be made in the form, construction and arrangement of the several parts of the illustrated apparatus without departing from the spirit or scope of my invention or sacrificing any of its attendant advantages, the preferred form herein described being merely for the purpose of illustrating the invention.

The invention is hereby claimed as follows:

1. In a vehicle having axle means and a frame supported thereon, the combination, with the axle means and said frame, of supporting spring means, connecting means attaching said supporting spring means centrally on the frame, said supporting spring means being suspended on said axle means on opposite sides of and substantially equally spaced from said connecting means, and stabilizing means connected to the axle means and to the frame and comprising a linkage tending to maintain parallelism between the axle means and the frame, and including leaf-spring means capable of bending in either direction from normal position in the plane in which said linkage operates, said leaf-spring means comprising a continuous spring shackled at its opposed ends on the axle means and having a pair of symmetrically-arranged spring portions, each of which is rockingly connected on said frame on opposite sides of the center of gravity thereof.

2. In a vehicle having axle means and a frame supported thereon, the combination, with the axle means and said frame, of supporting spring means, connecting means attaching said supporting spring means centrally on the frame, said supporting spring means being suspended on said axle means on opposite sides of and substantially equally spaced from said connecting means, and stabilizing means connected to the axle means and to the frame and comprising a linkage to maintain parallelism between the axle means and the frame and including leaf-spring means capable of bending in either direction from normal position in the plane in which said linkage operates, said leaf-spring means comprising a continuous spring shackled at its opposed ends on the axle means and having a pair of symmetrically-arranged spring portions, each of which is connected on said frame on opposite sides of the center of gravity thereof, said supporting spring means comprising a leaf-spring element connected intermediate its ends to said frame, and means to support the opposed ends of said leaf-spring element on said continuous spring adjacent the shackled ends thereof.

3. In a vehicle having axle means and a frame supported thereon, the combination, with the axle means and said frame, of supporting spring means, connecting means attaching said supporting spring means centrally on the frame, said supporting spring means being suspended on said axle means on opposite sides of and substantially equally spaced from said connecting means, and stabilizing means connected to the axle means and to the frame and comprising a linkage tending to maintain parallelism between the axle means and the frame and including leaf-spring means capable of bending in either direction from normal position in the plane in which said linkage operates, said leaf-spring means comprising symmetrically-arranged spring elements connected on said frame on opposite sides of the center of gravity thereof, said elements having ends interconnected for relative pivotal movement and free ends shackled on said axle means, said supporting spring means comprising a leaf-spring element rockingly connected intermediate its ends to said frame, and means to support the opposed ends of said leaf-spring element on said symmetrically-arranged spring elements adjacent the shackled ends thereof.

4. In a vehicle having axle means and a frame supported thereon, the combination, with the axle means and said frame, of supporting spring means, connecting means attaching said supporting spring means centrally on the frame, said supporting spring means being suspended on said axle means on opposite sides of and substantially equally spaced from said connecting means, and stabilizing means connected to the axle means and to the frame and comprising a linkage tending to maintain parallelism between the axle means and the frame and including leaf-spring means capable of bending in either direction from normal position in the plane in which said linkage operates, said leaf-spring means comprising a continuous spring shackled at its opposed ends on the axle means and having a pair of symmetrically-arranged spring portions, one of which is connected on said frame in a fashion preventing relative movement between the spring portion and frame in the longitudinal direction of the spring, while the other portion is linked to the frame in a fashion permitting relative movement.

5. In a vehicle having front and rear axles, each carrying a pair of wheels and a frame supported on said axles, the combination, with the axles and said frame, of supporting spring means, connecting means attaching said supporting spring means centrally on the frame, said supporting spring means being suspended on said axles, and stabilizing means interconnected with said axles and the frame and comprising a linkage tending to maintain parallelism between the axles and the frame and including leaf-spring means capable of bending in either direction from normal position in planes in which said leaf-spring means operates, said leaf-spring means being connected with the front and rear axles of the vehicle, while the supporting spring means comprises an element arranged longitudinally with respect to the frame and supported at its opposite ends on said leaf-spring means adjacent the front and rear axles of the vehicle, said element being pivotally connected on said frame intermediate the ends of said element.

6. In a vehicle having front and rear axles, each carrying a pair of wheels and a frame supported on said axles, the combination, with the axles and said frame, of supporting spring means, connecting means attaching said supporting spring means centrally on the frame, said supporting spring means being suspended on said axles, and stabilizing means interconnected with said axles and the frame and comprising a linkage tending to maintain parallelism between the axles and the frame and including leaf-spring means capable of bending in either direction from normal position in planes in which said leaf-spring means operates, said leaf-spring means being connected with the front and rear axles of the vehicle on the opposite sides thereof, while the supporting spring means comprises a pair of leaf-spring elements arranged longitudinally with respect to the frame and connected at their opposite ends on said leaf-spring means adjacent the front and rear axles of the vehicle, frame means interconnecting said elements intermediate the opposed ends thereof, and means on said frame means for supporting the frame thereon for free universally pivoted movement.

7. In a vehicle having front and rear axles, each carrying a pair of wheels and a frame supported on said axles, the combination, with the axles and said frame, of supporting spring means, connecting means attaching said supporting spring means centrally on the frame, said supporting spring means being suspended on said axles, and stabilizing means interconnected with said axles and the frame and comprising a linkage tending to maintain parallelism between the axles and the frame and including leaf-spring means capable of bending in either direction from normal position in planes in which said leaf-spring means operates, said leaf-spring means comprising a plurality of spring elements, a forward pair of which are connected on the front axle means of the vehicle adjacent said wheels, and a rearward pair of which are connected on the rear axle means of the vehicle adjacent the wheels, means interconnecting the forward pair and tiltingly supporting the same on the chassis, means interconnecting said rearward pair and pivotally mounting the same on the chassis, and resilient means interconnecting said forward and rearward pairs whereby rotation of one pair with respect to the chassis will urge a corresponding rotation of the other pair.

8. In a vehicle having axle means carrying spaced wheels and a frame supported on said axle means, the combination, with the axle means and said frame, of supporting spring means, connecting means attaching said supporting spring means on the frame substantially centrally thereof, and stabilizing means comprising leaf-spring means pivoted on said frame for rocking movement about spaced axes, said leaf-spring means having portions connected on said axle means adjacent said wheels, and said supporting spring means having portions extending on opposite sides of said connecting means and suspended on said leaf-spring means adjacent the point of connection thereof on said axle means.

JUNIUS FORD COOK.